United States Patent [19]
Jürgens et al.

[11] Patent Number: 5,172,602
[45] Date of Patent: Dec. 22, 1992

[54] HYDRAULICALLY-ASSISTED AUTOMATIC SKIP SHIFTING METHOD OF A MULTI-PATH TOOTHED-WHEEL GEAR CHANGE BOX

[75] Inventors: Gunter Jürgens, Stuttgart; Gerhard Wagner, Remseck; Frank Tietze, Stuttgart, all of Fed. Rep. of Germany

[73] Assignee: Mercedes-Benz AG, Fed. Rep. of Germany

[21] Appl. No.: 772,659

[22] Filed: Oct. 5, 1991

[30] Foreign Application Priority Data

Oct. 5, 1990 [DE] Fed. Rep. of Germany ....... 4031570

[51] Int. Cl.$^5$ ............................................. F16H 61/08
[52] U.S. Cl. .................................... 74/335; 364/424.1
[58] Field of Search ................ 74/335, 333, 358, 359; 364/424.1

[56] References Cited

U.S. PATENT DOCUMENTS

| | | | |
|---|---|---|---|
| 4,513,631 | 4/1985 | Koivunen | 74/359 X |
| 4,627,312 | 12/1986 | Fujieda et al. | 364/424.1 X |
| 4,742,732 | 5/1988 | Hiramatsu | 364/424.1 X |
| 4,993,285 | 2/1991 | Asayama et al. | 74/335 X |

FOREIGN PATENT DOCUMENTS 0273735 7/1988 European Pat. Off. .
2848624 5/1980 Fed. Rep. of Germany .
3406218 8/1984 Fed. Rep. of Germany .

OTHER PUBLICATIONS

VDL-Gesellschaft Entwicklung Konstruktion Vertieb Planetengetribe, Eine Leistungstahige Komponente des Antriebstedinik, Mar. 17, 1988 pp. 379-385.

Primary Examiner—Leslie A. Braun
Assistant Examiner—Khoi Q. Ta
Attorney, Agent, or Firm—Evenson, Wands, Edwards, Lenahan & McKeown

[57] ABSTRACT

A method for the automatic shifting of a multi-path toothed-wheel gear change box between two gears which are formed in a first gearbox subunit temporarily engages a middle gear formed in a second, parallel gearbox subunit. It is simultaneously ensured, by control of the working pressures for actuating the power-shift clutches connecting the gearbox subunits to the input shaft, that the speed characteristic of the input shaft shifting is essentially steady without remaining at the middle gear speed value.

21 Claims, 4 Drawing Sheets

HYDRAULICALLY-ASSISTED AUTOMATIC SKIP SHIFTING METHOD OF A MULTI-PATH TOOTHED-WHEEL GEAR CHANGE BOX

CROSS-REFERENCE TO RELATED APPLICATION

This application is related to commonly assigned application Ser. No. 07/770,864 filed on Oct. 4, 1991 in the name of Wolfgang Zaiser, et al. for AUTOMATIC SHIFTING DEVICE OF A MULTI-PATH TOOTHED-WHEEL GEAR CHANGE BOX.

BACKGROUND AND SUMMARY OF THE INVENTION

The present invention generally relates to a hydraulically-assisted automatic shifting method and associated apparatus in accordance and, more particularly, to a method for the hydraulically-assisted automatic shifting of a multi-path toothed-wheel gear change box with a gearbox arrangement in which an input shaft can be brought into driving connection with an output shaft via at least on of at least two gearbox subunits arranged in parallel to one another in a force flux, one power-shift clutch is arranged in the force flux between the input shaft and in each case one gearbox subunit, at least one of the gearbox subunits has at least two gearwheel stages with in each case one loose wheel which can be coupled to its shaft by a positively engaging gearwheel clutch, and the transmission ratios of the gearwheel stages are configured such that, in each case in relation to two gears adjacent in terms of their transmission ratio, in one gear one associated gearbox subunit: and, in the adjacent gear, another gearbox subunit associated with the latter is connected into the driving connection by subjecting in each case one clutch actuator actuating the associated power-shift clutch to working pressure.

In a known shifting method, as shown in VDI Report No. 672, 1988, page 383, with a gearbox arrangement having two gearbox subunits, it is regarded as disadvantageous that shifts without an interruption to the tractive force are only possible between two gears in which the flux of force does not take place via one and the same gearbox subunit and a crossover control for the power-shift clutches ca consequently be effected. For this reason, skipping gears has only been considered to be possible over two gears.

EP 0 273 735 A2 discloses a method for electronic control of a toothed-wheel gear change box which is connected downstream in an engine flux of force, via a power-shift clutch and in which an optimum gear is selected as a function of shift characteristics which take account of driving speed and accelerator-pedal position. When a shift command for an upshift via two or more gears is issued, a shift is first effected into the next-highest gear for a predetermined period of time, during which the upshift of the shift command is suppressed.

DE 34 06 218 A1 discloses a method for hydraulically assisted automatic downshifting from the fourth gear to the second gear of a multi-path planetary gear change box with a gearbox arrangement in which, in fourth gear, an input shaft can be brought into driving connection with an output shaft via a first, simple planetary gearbox subunit by engaging a first frictional shifting clutch situated between the input shaft and this gearbox subunit in the flux of force. In second gear, it is brought into driving connection with the input shaft additionally via a second simple planetary gearbox subunit by a direct connection between the input shaft and the inner sun gear of the second gearbox subunit and by engaging a second frictional shifting clutch connected to the planet carrier of the first gearbox subunit and to the outer sun gear of the second gearbox unit. In the intermediate third gear, the input shaft and the output shaft are coupled to one another by engaging both shifting clutches via the two gearbox subunits which, as a result, revolve as a block. During the shift from fourth to second, a restriction device comes into effect which retards the engagement of the second shifting clutch relative to its engagement during the shift from fourth to third.

An underlying object of the present invention consists essentially in providing a shifting method in which a shift is made possible without an interruption to the tractive force, between two gears which, in terms of their transmission ratio, are nonadjacent and for which one and the same gearbox subunit is connected into the driving connection between the input shaft and the output shaft. Consequently, in a gearbox arrangement having, for example, only two gearbox subunits, only a single gear is skipped (shifts via two gears).

The foregoing object has been explained is achieved in an advantageous manner by utilizing a shifting method and associated apparatus in which the purpose of changing over between two nonadjacent gears, in each case another associated gearwheel stage of the sam gearbox subunit is connected into the driving connection, a middle gear which lies between the two nonadjacent gears in its transmission ratio and in which a gearwheel stage of another gearbox subunit is connected into the driving connection and temporarily engaged, and the working pressure in the clutch actuators of the power-shift clutches of the two gearbox subunits taking part in the changeover is controlled in such that the characteristic of the speed of the input shaft between the speed value corresponding to the old gear and the speed value corresponding to the new gear is at least approximately steady, without remaining at the speed value of the middle gear.

In the method of the present invention, unpleasant torque fluctuations at the output shaft are largely avoided because, on one hand, a direct jump of the torque between the torque values associated with the two nonadjacent gears is avoided and, on the other hand, the torque in the middle gear which is engaged and disengaged transitorily, in each case by a crossover control i.e. without interruption to the tractive force is adjusted to a torque value by the working pressure for the actuation of the power-shift clutch associated with this gear such that a low-jerk transmission between this torque value and the two torque values of the nonadjacent gears is in each case obtained.

The method of the present invention can be used both for upshifts and for downshifts. For upshifts, the clutch torque in the middle gear in the sense according to the invention is held above the value associated with this middle gear whereas, for downshifts, the clutch torque is held correspondingly below the value associated with the middle gear.

In the event of a downshift via two gears which are nonadjacent in terms of their transmission ratio in the method according to the present invention, it is ensured that, in a first shifting phase, the engine can increase its revs by virtue of a reduction in the working pressure, i.e. the speed of the input shaft rises steadily from the beginning of the shift.

In the first shifting phase, the clutch actuator for actuating the power-shift clutch of the gearbox subunit which is connected into the driving connection in the middle gear can be filled or placed under an application pressure.

When the engine speed and thus the speed of the input shaft reaches the speed value of the middle gear during the increase in revs, it is possible with the present invention for a changeover in the actuation of the power-shift clutches to take place. The middle gear is engaged with reduced excitation of the power-shift clutch concerned without the steady rise in the speed of the input shaft being interrupted, with the result that no significant torque jumps at the output of the gearbox occur either.

When the speed of the input shaft has risen almost to the speed value of the new gear, the engine can be levelled off, i.e. the increase in the revs of the engine reduced.

When the filling of the clutch actuator for actuating the power-shift clutch of the gearbox subunit connected into the driving connection in both nonadjacent gears is complete, this being indicated by a pressure rise in the clutch actuator, it is possible, according to the present invention, for a crossover control to be triggered for the purpose of shifting to the new gear without an interruption to the tractive force.

In the case of shifts of multi-path toothed-wheel gear change boxes having loose wheels which can in each case be coupled to their shaft by a gearwheel clutch, it is customary, in a gearbox subunit in each case not connected into the driving connection between the input shaft and the output shaft, to, as it were, preselect the loose wheel of a gearwheel stage adjacent to the respectively selected gear as regards the transmission ration by engaging its associated gearwheel clutch.

In the case of a downshift via two nonadjacent gears in the method according to the invention, the gearwheel stage of the middle gear is engaged.

With a downshift via two nonadjacent gears in the method according to the invention, the gearwheel clutch of the gearwheel stage of the lower of the two nonadjacent gears is engaged.

With an upshift via two gears which are nonadjacent in terms of their transmission ratio in the method according to the invention, measures are first taken as a preparation for a shift to the middle gear. A subsequent engagement of the middle gear without an interruption to the tractive force then takes place in accordance with the crossover control.

When the power-shift clutch of the middle gear is capable of transmitting the torque of the input shaft on its own, the other power-shift clutch or the associated working pressure of the latter is disconnected completely, with the result that the middle gear can be engaged and the torque fed in to a level which is sufficiently high above the torque value associated with the middle gear for the engine or its speed to be steadily retarded.

In preparation for an engagement of the higher of the two nonadjacent gears in the method according to the present invention, a clutch-control signal for filling the power-shift clutch associated with the higher gear or the clutch actuator concerned is produced in the third shifting phase. This is followed by a shift from the middle to the higher gear without an interruption to the tractive force while the characteristic of the engine speed continues to fall steadily.

In a following shifting phase, the engine continues to be steadily retarded in its speed. The upshift via two nonadjacent gear is ended when the engine speed has fallen to the speed value corresponding to the higher gear.

With an upshift via two nonadjacent gears in the method according to the present invention, the gearwheel clutch of the gearwheel stage of the middle gear can be actuated o controlled and the gearwheel clutch of the gearwheel stage of the higher gear actuated or controlled.

In the case of an upshift via two nonadjacent gears, the clutch-control signal for the beginning of filling of the power-shift clutch or of the clutch actuator of the higher gear in the third shifting phase can be produced.

BRIEF DESCRIPTION OF THE DRAWINGS

These and other objects, features and advantages of the present invention will become more readily apparent from the following detailed description of several currently preferred embodiments when taken in conjunction with the accompanying figures wherein.

DETAILED DESCRIPTION OF THE DRAWINGS

Figure 1:
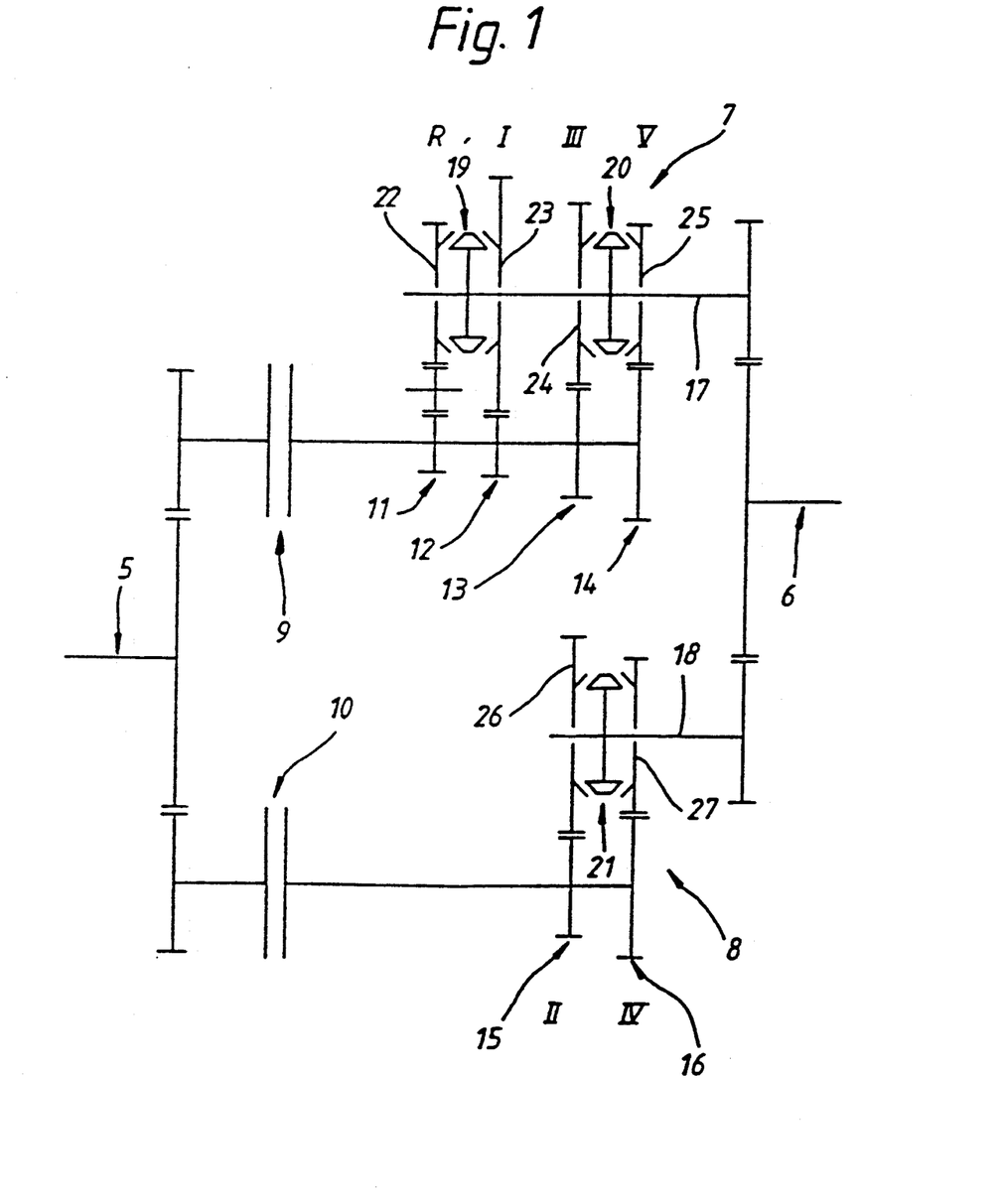
FIG. 1 is a schematic view of a two-path, toothed-wheel gear change the method according to the present invention.

Referring to FIG. 1, an input shaft 5, which can be driven by a motor vehicle engine via a hydrodynamic torque converter, is connected, with the interposition of, in each case, one power-shift clutch 9 and 10 respectively, via two gearbox subunits 7, 8 arranged in parallel to one another in the flux of force to an output shaft 6 which can be in or be brought into driving connection in the customary manner with at least one vehicle axle of the motor vehicle.

One gearbox subunit 7 has four gearwheel stages 11 to 14, by means of which the reverse gear R and the three forward gears I, III and V respectively can be formed. The two loose wheels 22, 23 of the spatially adjacent gearwheel stages 11, 12 can be coupled optionally to their countershaft 17 by an intermediate gearwheel clutch 19, which is shown in the neutral, disengaged position. The two loose wheels 24, 25 of the spatially adjacent gearwheel stages 13, 14 can be coupled optionally to the countershaft 17 by an intermediate gearwheel clutch 20, which is also shown in its neutral, disengaged position.

The other gearbox subunit 8 has a gearwheel stage 15 with a loose wheel 26 for the formation of the second gear, and a spatially adjacent gearwheel stage 16 with a loose wheel 27 for the formation of the fourth gear. The two loose wheels 26, 27 can be coupled optionally to their countershaft 18 by an intermediate gearwheel clutch 21, shown in its neutral, disengaged position.

The gearwheel clutches 19, 20 of one gearbox subunit 7 are engaged when the associated power-shift clutch 9 has been disengaged and the force flux has been directed via one of the gear wheel stages 15, 16 of gearbox subunit 8 by engagement of the other power-shift clutch 10.

The gearwheel clutch 21 of the other gearbox subunit 8 is engaged by preselection when the associated power-shift clutch 10 has been disengaged and the force flux has been directed via one of the gearwheel stages 11 to 14 of gearbox subunit 7 by engagement of the other power-shift clutch 9.

In order to be able to perform a crossover control of the two power-shift clutches 9, 10 for the gear change between two gears which are adjacent in terms of the transmission ratio without interruption to the tractive force the transmission ratios of gearwheel stages 11 to 16 are matched to one another in such a way that, for these gear changes, a changeover of the force flux from one gearbox subunit to the other also occurs. Crossover controls are per se known, as shown, for example, in Forster "Das kraftschlussige Schalten von Übersetzungsstufen von Fahrzeuggetrieben" (The frictional shifting of transmission stages of vehicle gearboxes) VDI-Zeitung 99 No. 27; 21st September (1957).

In contrast, the method according to the invention makes possible a changeover without interruption to the tractive force between two gears which are formed in the same gearbox subunit and, due to the above-mentioned configuration of the transmission ratios of the gearwheel stages, are not adjacent to one another. The method is described below for a downshift, for example from fourth to second gear, with particular reference to FIG. 3 and for an upshift, for example from second to fourth gear, with particular reference to FIG. 4. All the possible upshifts and downshifts via two nonadjacent gears can, of course, also be carried out in accordance with the method according to the present invention in the illustrated embodiment of a gearbox arrangement.

Figure 2:
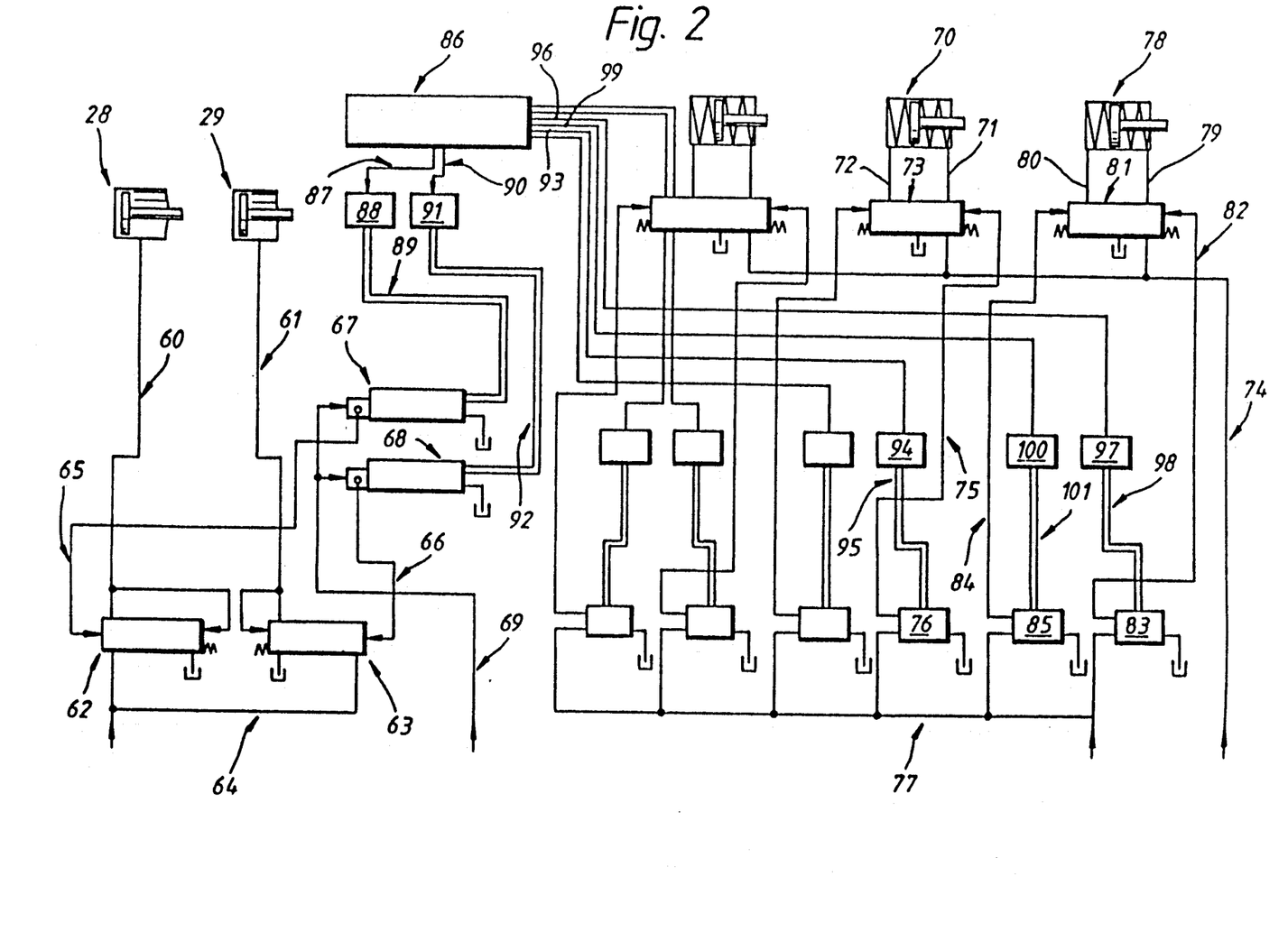
FIG. 2 is a block diagram of a control and shifting device for the two-path, toothed-wheel gear change box of FIG. 1.

First, however, a more detailed explanation of the block diagram in FIG. 2 will be given insofar as it is necessary of the understanding of the two shifts between second and fourth gear. The power-shift clutch 9 for connecting the gearbox subunit 7 into the driving connection between the input shaft 5 and the output shaft 6 can be engaged by resilient means (not shown). Connected to the clutch actuator 28 for the purpose of subjecting its axial piston to working pressure is a working-pressure line 60 which leads to a clutch-shift valve 62 fed by a main pressure line 64 and controlled via a control-pressure line 65 by an electromagnetic proportional valve 67.

The power-shift clutch 10 for connecting the gearbox subunit 8 into the driving connection between the input shaft 5 and the output shaft 6 is engaged by a clutch actuator 29 of the axial-piston type and is disengaged by resilient means (not shown). Connected to the clutch actuator 29 for the purpose of subjecting its axial piston to pressure is a working-pressure line 61 which leads to a clutch-shift valve 63 fed by the main pressure line 64 and controlled via a control-pressure line 66 by an electromagnetic proportional valve 68.

A conventional gearbox control 86, which operates in a known manner with the aid of stored shift characteristics as a function of input signals, in particular relating to the driving speed, the engine load, the power requirement, the gearbox condition and a selection device, has outputs 87, 90 which are connected via an output stage 88, 91 respectively to, in each case, one of the proportional valves 67, 68 by control lines 89, 92 which are supplied with pressure via a secondary pressure line 69.

The gearwheel clutch 20 of the gearbox subunit 8 can be actuated by a shifting actuator 70 of the axial-piston type which is held by resilient means in the illustrated central neutral position, in which position loose wheels 24, 25 are uncoupled from the countershaft 17. The shifting actuator 70 can be shifted into its two end positions via connected working-pressure lines 71, 72 which lead to a shift valve 73. The shift valve 73, which is fed by a secondary pressure line 74, can be controlled via a control-pressure line 75 by an electromagnetic shift-control valve 76 which is fed by a further secondary pressure line 77 and can be controlled by a output 93 of the gearbox control 86 via an output stage 94 and a connected control line 95.

The gearwheel clutch 21 of the gearbox subunit 8 can be actuated by a shifting actuator 78 of the axial-piston type, which is held by resilient means in the illustrated central neutral position. In this neutral position, both loose wheels 26 and 27 are uncoupled from the countershaft 18. The shifting actuator 78 can be shifted into its two end positions via connected working-pressure lines 79, 80 which lead to a shift valve 81 which is fed by the secondary pressure line 74 and are controlled via connected control-pressure lines 82, 84 by electromagnetic shift-control valves 83 and 85 which are fed by the secondary pressure line 77. The shift-control valves 83, 85 are controlled from outputs 96, 99 of the gearbox control 86 by connected control lines 98, 101 with output stages 97 and 100.

Figure 3:
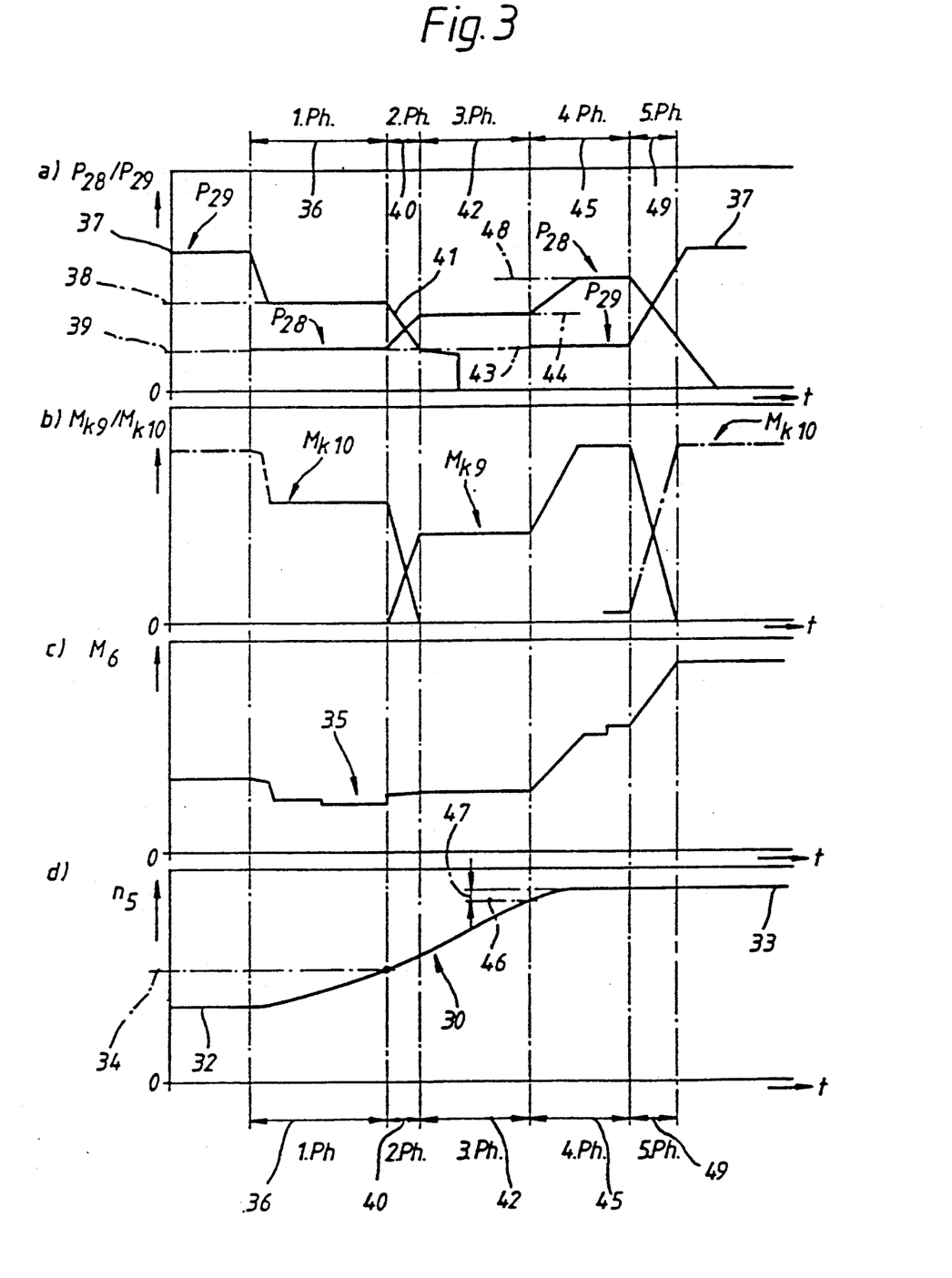
FIGS. 3a–d are four diagrams showing the characteristic of the working pressures (3a), of the clutch torques of the power-shift clutches (3b), of the output torque (3c), and of the speed of the input shaft (3d) respectively plotted against time, in a first embodiment for a downshift via two nonadjacent gears.

The course of a downshift from fourth gear to second gear in the toothed-wheel gear change box of FIG. 1 is shown in five shifting phases in FIG. 3. The characteristic of the working pressure $p_{28}$ in the clutch actuator 28 of power-shift clutch 9 and the characteristic of the working pressure $p_{29}$ in the clutch actuator 29 of power-shift clutch 10 are shown plotted against time t in FIG. 3a. The characteristic of the clutch torque $M_{K9}$ of power-shift clutch 9 and the characteristic of the clutch torque $M_{K10}$ of power-shift clutch 10 are shown plotted against time t in FIG. 3b. The characteristic of the output torque $M_6$ of the output shaft 6 is shown plotted against time t in FIG. 3c. Finally, FIG. 3d shows the characteristic of the speed $n_5$ of the input shaft 5 plotted against time t.

In the initial condition of the toothed wheel gear change box (i.e. in fourth gear), the power-shift clutch 10 is engaged, and the working pressure $p_{29}$ in the associated clutch actuator 29 is set to an engagement pressure value 37 by the proportional valve 68. At this engagement pressure 37 the power-shift clutch 10 transmits only the torque of the input shaft 5. In the associated gearbox subunit 8, the loose wheel 27 of the gearwheel stage 16 of the fourth gear is connected by the gearwheel clutch 21 to the countershaft 18, with the result that the gearbox subunit 8 is connected to the driving connection between the input shaft 5 and the output shaft 6. For this purpose, the working-pressure line 80 of the shifting actuator 78 is connected by the shift valve 81 to the secondary pressure line 74 in order to actuate the gearwheel clutch 21 into the position in which it couples the loose wheel 27 to the countershaft 18. The shift-control valve 85 for the fourth gear, excited by the gearbox control 86, controls this shaft valve 81 in the appropriate fashion. In the case of the gearbox subunit 7, the power-shift clutch 9 is disengaged because the working pressure $p_{28}$ in the associated clutch actuator 28 is shut off by the clutch control valve 62 at the instigation of the proportional valve 67. The electromagnetic shift control valve excited by the gearbox control 86 has switched shift valve 73 into the position in which the working-pressure line 71 for actuating the shifting actuator 70 into the end position for coupling the loose wheel 24 of the gearwheel stage 13 of the third gear by way of gearwheel clutch 20 is connected to the secondary pressure line 74, with the result that third gear is preselected in gearbox subunit 7.

When a shift signal for shifting down from fourth gear into second gear occurs in the gearbox control 86, corresponding signals at outputs 87, 90 trigger a first shifting phase 36, in which proportional valve 68 causes a reduction in the working pressure $p_{29}$ of the clutch actuator 29 of power-shift clutch 10 to a constant phase pressure value 38 which is between the engagement pressure value 37 and a low application value 43 and permits a steady increase in the revs of the engine, as the steady rise 30 in the speed $n_5$ between the speed value 32 corresponding to fourth gear and the speed value 34 corresponding to third gear shows. With the beginning of the first shifting phase 36, the proportional valve 67 continues to cause working pressure $p_{28}$ to be fed into the clutch actuator 28 of power-shift clutch 9 via clutch control valve 62, this working pressure $p_{28}$ coming to an application pressure value 39 during the filling process.

When the speed $n_5$ of the input shaft 5 has reached the speed value 34 corresponding to third gear, a second shifting phase 40, following the first phase 36, is triggered, in which the working pressure $p_{29}$ of the clutch actuator 29 of power-shift clutch 10 is shut off in accordance with a ramp function 41 and the working pressure $p_{28}$ of the clutch actuator 28 of power-shift clutch 9 is correspondingly increased by a known type of crossover control. In this way, a temporary shift from fourth gear to third gear is initiated without interruption to the tractive force, and the pressure level is set only high enough to allow the engine to continue the steady increase in revs.

When the working pressure $p_{29}$ has fallen to the application pressure value 43, a third shifting phase 42, following the second phase 40, is triggered, in which the working pressure $p_{29}$ of the clutch actuator 29 of power-shift clutch 10 is shut off completely, and the working pressure $p_{28}$ of the clutch actuator 28 of power-shift clutch 9 is adjusted to a phase pressure value 44 of the engagement pressure value associated with third gear and is only high enough for the characteristic 30 of the speed $n_5$ of the input shaft 5 to continue to rise steadily without remaining at the speed value of the third gear. In the third shifting phase 42, a preselective changeover to the gearwheel stage 15 of second gear is performed in the gearbox subunit 8, in particular when the working pressure $p_{29}$ of the clutch actuator 29 of the associated power-shift clutch 10 has been completely shut off. This changeover is performed by the gearbox control 86 exciting the shift-control valve 83 of the second gear instead of the shift-control valve 85, with the shift valve 81 thereby being switched over into the position in which secondary pressure line 74 is connected to the working-pressure line 79 of the shifting actuator 78, and the gear wheel clutch 21 thereby being actuated into the position in which it couples the loose wheel 26 of the gearwheel stage 15 of second gear to the countershaft 18.

When, after a uniformly steady variation, the speed $n_5$ of the input shaft 5 has reached a speed lead value 46, which is lower by a fixed differential speed 47 than the speed value 33 corresponding to second gear, a fourth shifting phase 45 following the third phase 42 is triggered in which proportional valve 67, under appropriate influence from the gearbox control 86, causes an increase, via clutch-shift valve 62, in the working pressure $p_{28}$ in the clutch actuator 28 of power-shift clutch 9 to a phase pressure value 48 higher than the phase pressure value 44 of the previous shifting phase. At the same time, proportional valve 68, likewise controlled in appropriate fashion by the gearbox control 86, initiates the filling process for the clutch actuator 29 of power-shift clutch 10 by causing working pressure $p_{28}$ to be fed in via clutch-shift valve 63, with the pressure coming in the process to the application pressure value 43.

In order to level off the engine, the increased phase pressure value 48 of the working pressure $p_{28}$ is matched to the application pressure value 43 of the working pressure $p_{29}$ such that both power-shift clutches 9 and 10 together transmit the engine torque, i.e. the torque of the input shaft 5, and the speed $n_5$ of the input shaft 5 is held at the speed value 33 of the second gear.

When the filling process in the clutch actuator 29 of power-shift clutch 10 is complete, this being indicated by a rise in the working pressure $p_{29}$ beyond the application pressure value 43, a fifth shifting phase 49 following the fourth phase 45 is working pressures $p_{28}$, $p_{29}$, the power-shift clutch 9 of the third gear is disconnected and the power-shift clutch 10 of the second gear is connected fully, i.e. with expiration of the fifth shifting phase 49, power-shift clutch 10 is transmitting the full torque of the input shaft 5, at which time the working pressure $p_{29}$ has reattained the corresponding engagement pressure value 37.

The characteristic of the clutch torques $M_{K9}$ and $M_{K10}$ of the two power-shift clutches 9, 10 in FIG. 3b is self-explanatory by virtue of the above-explained curves in FIG. 3a for the associated working pressures $p_{28}$ and $p_{29}$. FIG. 3c illustrates the low-jerk characteristic 35 of the output torque $M_6$ of the output shaft 6 during the shift from fourth to second according to the present invention.

Figure 4:
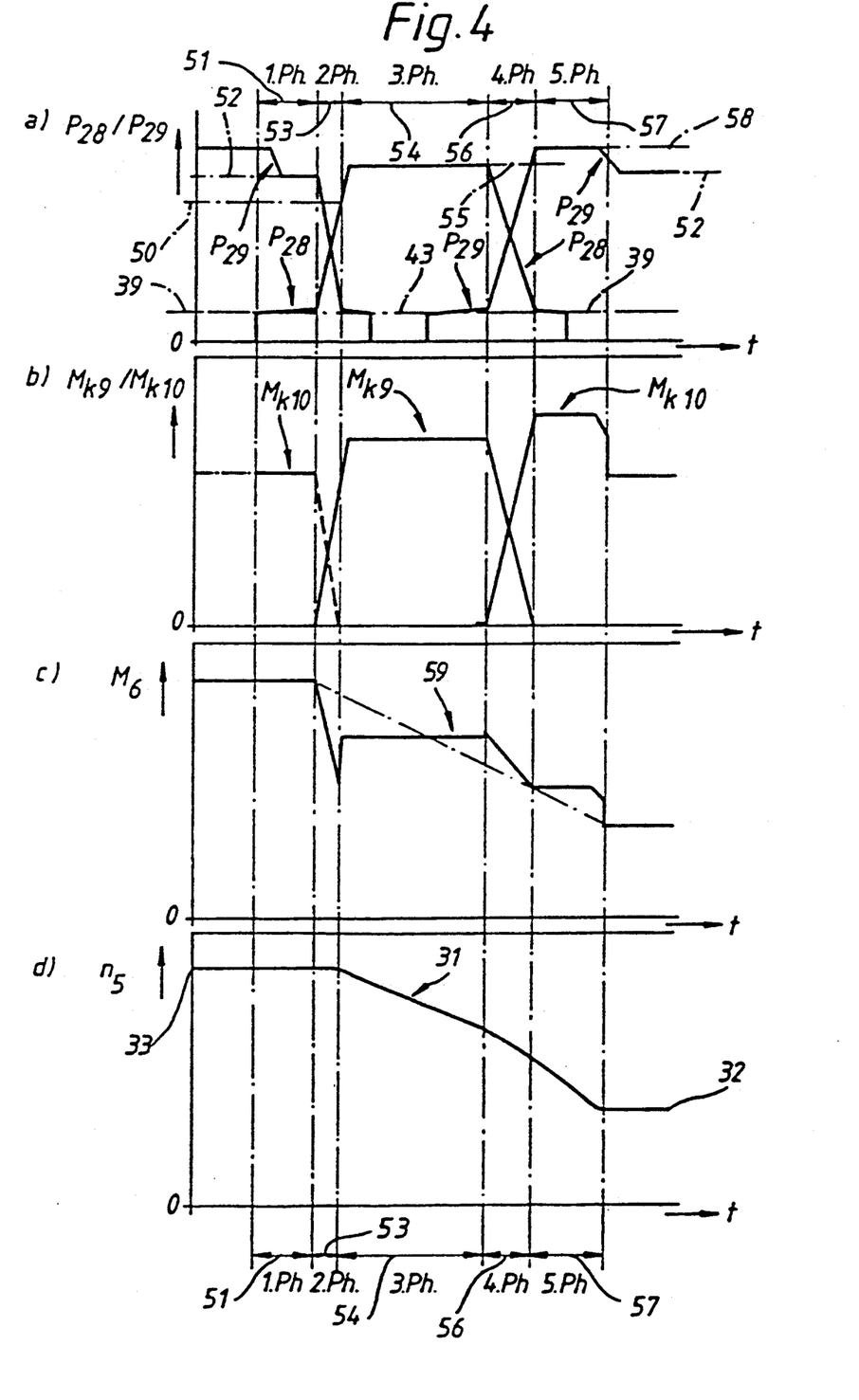
FIGS. 4a–d are diagrams corresponding to FIGS. 3a–3d but illustrating a second embodiment for an upshift via two nonadjacent gears.

The method according to the present invention is also explained below, with reference to the five shifting phases of FIG. 4, for a second embodiment for an upshift via two gears, i.e. from second to fourth gear, in the two-path toothed-wheel gear change box of FIG. 1.

In the initial condition of the toothed-wheel gear change box (that is to say, in second gear), the power-shift clutch 9 in the gearbox subunit 7 is disengaged, because the working pressure $p_{28}$ in the associated clutch actuator 28 is completely shut off by the clutch-shift valve 62. The loose wheel 24 of the gearwheel stage 13 of the third gear is preselectively coupled to its countershaft 17 by gearwheel clutch 20 because the shift-control valve 76 of the third gear is excited by the gearbox control 86. As a result, the shift-control valve 76 has switched the shift valve 73 into the position in which the secondary pressure line 74 is connected to the working-pressure line 71 of shifting actuator 70, via which pressurization for actuation of gearwheel clutch 20 into the position in which it couples loose wheel 24 to countershaft 17 occurs.

When a shift signal for an upshift from second gear to fourth gear occurs in the gearbox control 86, then a first shifting phase 51 is triggered, via corresponding signals at the outputs 87 and 90, in which the working pressure $p_{29}$ in the clutch actuator 29 of power-shift clutch 10 is adjusted at the instigation of proportional valve 68 to an engagement pressure value 52, at which power-shift clutch 10 still transmits the full torque of the input shaft while proportional valve 67 initiates the filling process in the case of the clutch actuator 28 of power-shift clutch 9 by feeding in working pressure $p_{28}$, the latter coming in the course of the filling process to an application pressure value 39. During this process, the speed $n_5$ of the input shaft 5 does not yet change i.e. remains constant.

When the filling process in the clutch actuator 28 of power-shift clutch 9 is complete, this being indicated by a rise in the working pressure $p_{28}$ beyond the application pressure value 39, a second shifting phase 53 following the first phase 51 is triggered. In the second phase 53, using the customary crossover control for the relevant working pressures $p_{28}$, $p_{29}$, the power-shift clutch 9 is engaged and the power-shift clutch 10 is disengaged. This shifting phase thus proceeds without interruption to the tractive force and remains at a constant speed (i.e. speed value 33 of the second gear) of the input shaft 5.

When the working pressure $p_{29}$ in the clutch actuator 29 of the power-shift clutch 10 has fallen to the application pressure value 43, to which the working pressure $p_{29}$ comes during the filling of the clutch actuator 29 and at which the working pressure $p_{28}$ of the clutch actuator 28 of power-shift clutch 9 has risen to the second engagement pressure value 50 of the third gear, the power-shift clutch 9 is then capable of transmitting the full torque of the input shaft 5 on its own. A third shifting phase 54 following the second phase 53 is then triggered in which, although third gear is selected, the working pressure $p_{28}$ of the clutch actuator 28 of the power-shift clutch 9 transmitting the power during this process is adjusted to a phase pressure value 55 which is higher than the second engagement pressure value 50, with the result that the engine is retarded to such an extent that, starting from the speed value 33 at the end of the second shifting phase 53, its speed and thus the speed $n_5$ of the input shaft 5 takes a steadily falling or declining course 31 without remaining at the speed value of the third gear.

In the third shifting phase 54, in particular when the working pressure $p_{29}$ of the clutch actuator 29 of power-shift clutch 10 is completely shut off and gearbox subunit 8 is thus completely without driving torque, a changeover from the gearwheel stage 15 of the second gear to the gearwheel stage 16 of the fourth gear is performed in the gearbox subunit 8 by the gearwheel clutch 21. This changeover is effected by subjecting the shifting actuator 78 to pressure via the working-pressure line 80. The shift-control valve 85 of the fourth gear is now excited by the gearbox control 8 instead of the shift-control valve 83 of the second gear. When, under these circumstances, the gearwheel clutch 21 reaches the position in which it couples the loose wheel 27 to the countershaft 18, a clutch control signal is produced, due to which the proportional valve 68 causes pressurization with working pressure $p_{29}$, via the clutch-shift valve 63, and a pressure rise to at least the application pressure value 43 in the clutch actuator 29 of power-shift clutch 10.

When the filling process in the clutch actuator 29 is complete in the third shifting phase 54, this being indicated by a rise in the working pressure $p_{29}$ beyond the application pressure value 43, a fourth shifting phase 56 following the third shifting phase 54 is triggered. In this fourth phase 56, using the customary crossover control for the relevant working pressures $p_{28}$, $p_{29}$, the power-shift clutch 9 of the third gear is disengaged and the power-shift clutch 10 of the fourth gear is engaged. This shifting phase also consequently proceeds without interruption to the tractive force, but with the required pressure level being fed in, with a characteristic 31 of the speed $n_5$ of the input shaft 5 which continues to fall steadily.

In order to continue to retard the engine steadily to the speed value 32 of the fourth gear, a fifth shifting phase 57 following the fourth shifting phase 56 is triggered when the working pressure $p_{28}$ in the clutch actuator 28 of power-shift clutch 9 has fallen to the application pressure value 39, the working pressure $p_{29}$ already having been adjusted upwards beyond the engagement pressure value 52 for the reasons mentioned. In this phase, the working pressure $p_{29}$ in the clutch actuator 29 of power-shift clutch 10 is adjusted to a phase pressure value 58 which is above the engagement pressure value 52.

Whereas the upshift is now complete in the fifth shifting phase 57 to the extent that the changeover of power transmission from the power-shift clutch 9 of the third gear to the power-shift clutch 10 of the fourth gear has been completed, the engine continues to be steadily retarded by the increased pressure level.

When the speed $n_5$ of the input shaft 5 has fallen to the speed value 32 corresponding to the fourth gear, however, the proportional valve 68 is caused by the gearbox control 86 to reduce the working pressure $p_{29}$ in the clutch actuator 29 of the power-shift clutch 10 of the fourth gear, to, for example, the engagement pressure value 52, for example, with the result that the speed $n_5$ is held at the speed value 32 of the fourth gear.

Due to the explanation of the pressure characteristics of the associated working pressures $p_{28}$, $p_{29}$ in FIG. 4a, FIG. 4b is self-explanatory as regards the respective characteristic of the clutch torque $M_{K9}$ of power-shift clutch 9 and of the clutch torque $M_{K10}$ of power-shift clutch 10. Likewise, FIG. 4c illustrates in a self-explanatory manner the low-jerk characteristic 59 of the output torque $M_6$ of the output shaft 6 during the upshift according to the present invention via two gears. The said characteristic deviates only to a small extent from a jerk-free characteristic.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Hydraulically-assisted automatic shifting apparatus of a multi-path toothed-wheel gear change box with a gearbox arrangement, comprising an output shaft, an input shaft configured to be brought into a driving connection with the output shaft, at least two gearbox subunits operatively arranged in parallel to one another in a torque transmission path and via least one of which the driving connection is established, power-shift clutches operatively arranged in the torque transmission path between the input shaft and in each gearbox subunit, at least one of the gearbox subunits has at least two gearwheel stages with one loose wheel configured to be coupled to an associated shaft by a positively engaging gearwheel clutch with operatively associated clutch actuator, the transmission ratios of the gearwheel stages are configured such that, for two gears nonadjacent to each other in terms of transmission ratio, in one gear of the two gears associated with one gearbox subunit is connected into the driving connection and, in an adjacent gear of the two gears, another gearbox subunit with the one gearbox subunit is connected into the driving connection by subjecting the clutch actuator actuating the associating power-shift clutch to working pressure, and means for changing over between nonadjacent gears in the case of which, in each case, the another gearbox subunit is connected into the driving connection to shift via a middle gear which lies between them in its transmission ratio and in which a gearwheel stage of the another gearbox subunit is connected into the driving connection is temporarily engaged, and the working pressure in the clutch actuators of the power-shift clutches of the two gearbox subunits is controlled such that a change in speed of the input speed between an old gear speed and a new gear speed is approximately constant, the working pressure in the clutch actuator of the power shift clutch of the second gearbox unit in a middle shifting phase being held at a constant phase pressure value deviating from an engagement pressure value associated with the middle gear so that the change in input speed changes without remaining at a speed value associated with the middle gear.

2. A method for hydraulically-assisted automatic shifting of a multi-path toothed-wheel gear change box with a gearbox arrangement comprising an input shaft configured to be brought into a driving connection with an output shaft via at least one gearbox subunits operatively arranged in parallel with one another in a torque transmission path, power-shift clutches operatively arranged in the torque transmission path between the input shaft and each gearbox subunit, at least one of the gearbox subunits has at least two gearwheel stages with each of the stages having a loose wheel which can be coupled to an associated shaft by a positively engaging gearwheel clutch, and transmission ratios of the gearwheel stages configured such that for two gears nonadjacent in terms of their transmission ratios, in one gear of the two gears associated one gearbox subunit is connected into the driving connection and, in an adjacent gear of the two gears, another gearbox subunit associated with the one gearbox subunit is connected into the driving connection by subjecting one clutch actuator actuating an associated power-shift clutch to working pressure, wherein for the purpose of changing over between an old gear and a new gear which are nonadjacent gears, the method comprises the steps of connecting the another gearbox subunit into the driving connection to shift, temporarily engaging a middle gear lies between the nonadjacent gears in terms of transmission ratio and in which a gearwheel stage of the another gearbox subunit is connected into the driving connection, and controlling working pressure in the clutch actuators of the power-shift clutches of the two gearbox subunits such that a change in speed of the input speed between an old gear speed and a new gear speed is approximately constant, the working pressure in the clutch actuator of the powershift clutch of the second gear box unit in a middle shifting phase being held at a constant phase pressure value deviating from an engagement pressure value associated with the middle gear so that the change of input speed changes without remaining at a speed value associated with the middle gear.

3. The method according to claim 2, wherein, in a first shifting phase triggered by a shift signal for a downshift via the two nonadjacent gears, the working pressure in that clutch actuator which is subjected in both nonadjacent gears to essentially full working pressure is reduced to a phase pressure value lower than an engagement pressure value, which maintains torque of the input shaft of the higher of the two nonadjacent gears.

4. The method according to claim 2, wherein, in a first shifting phase triggered by a shift signal for a downshift via two nonadjacent gears, the working pressure in that clutch actuator which, in the middle gear, is subjected as such to essentially the full working pressure is raised from zero to an application pressure value lower than the engagement pressure value which maintains torque of the input shaft.

5. The method according to claim 3, wherein, in a second shifting phase, which follows the first shifting phase and is triggered by occurrence of that speed value of the speed of the input shaft which corresponds to the middle gear, a crossover control of the working pressures is effected in the clutch actuators such that the working pressure in the clutch actuator which is essentially fully pressurized in both nonadjacent gears decreases in accordance with a ramp function.

6. The method according to claim 5, wherein, in a third shifting phase which follows the second shifting phase and is triggered by the occurrence of an application pressure value, lower than the phase pressure value of the first shifting phase, of the working pressure in the clutch actuator which is essentially fully pressurized in both nonadjacent gears, the working pressure in the clutch actuator which is essentially fully pressurized in the middle gear is held at a phase pressure value between the engagement pressure value associated with the middle gear and the engagement pressure value of the first shifting phase.

7. The method according to claim 6, wherein, in a fourth shifting phase, which follows the third shifting phase and is triggered by occurrence of a speed lead value at a fixed differential speed of the input shaft which corresponds to the lower of the two nonadjacent gears, the working pressure in the clutch actuator which is essentially fully pressurized in both nonadjacent gears is adjusted to the application pressure value, and the working pressure in the clutch actuator which is essentially fully pressurized in the middle gear is adjusted to a phase pressure value higher than the phase pressure value of the third shifting phase, and the higher phase pressure value is matched to the application pressure value such that the power-shift clutches together transmit the torque of the input shaft.

8. The method according to claim 7, wherein in a fifth shifting phase, which follows the fourth shifting phase and is triggered by a rise, beyond the application pressure value, in the working pressure in the clutch actuator which is essentially fully pressurized in both nonadjacent gears, a crossover control of the working pressures is effected such that only the power-shift clutch actuated by the clutch actuator which is essentially fully pressurized in both nonadjacent gears is transmitting the torque of the input shaft on completion of the fifth shifting phase.

9. The method according to claim 3, wherein, upon occurrence of the shift signal for a downshift via two nonadjacent gears, the gearwheel clutch for the loose wheel of the gearwheel stage of the middle gear is one of having been and being engaged in the gearbox subunit which can be connected into the driving connection in the middle gear.

10. The method according to claim 6, wherein, in the gearbox subunit which can be connected into the driving connection in both nonadjacent gears, the gearwheel clutch for the loose wheel of the gearwheel stage of the lower of the two nonadjacent gears is engaged in the third shifting phase, when the working pressure in the clutch actuator which actuates the power-shift clutch of this gearbox subunit is completely shut off.

11. The method according to claim 2, wherein, in a first shifting phase triggered by a shift signal for an upshift via two nonadjacent gears, the working pressure in the clutch actuator which is subjected to essentially the full working pressure in the middle gear, which working pressure is adjusted at least to an engagement pressure value which maintains the torque of the input shaft, is raised to an application pressure value lying between zero and the engagement pressure value.

12. The method according to claim 7, wherein, in a first shifting phase triggered by a shift signal for an upshift via two nonadjacent gears, the working pressure in the clutch actuator which actuates the power-shift clutch of the gearbox subunit connected into the driving connection in nonadjacent gears is held essentially at its full level to at least at an engagement pressure value which maintains torque of the input shaft.

13. The method according to claim 12, wherein, in a second shifting phase which follows the first shifting phase and is triggered by a rise, beyond the application pressure value, in the working pressure in the clutch actuator which is essentially fully pressurized in the middle gear, a crossover control of the working pressures is effected such that, as the working pressure rises in the clutch actuator which is essentially fully pressurized in the middle gear, the working pressure in the clutch actuator which is essentially fully pressurized in the two nonadjacent gears is reduced.

14. The method according to claim 13, wherein in a third shifting phase, which follows the second shifting phase and is triggered by the occurrence of an application pressure value, between zero and the engagement pressure value, of the working pressure in the clutch actuator which is essentially fully pressurized in both nonadjacent gears, the working pressure in the clutch actuator which is essentially fully pressurized in the middle gear is held at a phase pressure value which is higher than the engagement pressure value.

15. The method according to claim 14, wherein, in the third shifting phase, after the working pressure in the clutch actuator which is essentially fully pressurized in both nonadjacent gears has been completely shut off, a clutch-control signal is produced which triggers a pressurization with working pressure in the clutch actuator which is essentially fully pressurized in both nonadjacent gears with a pressure rise at least up to the application pressure value.

16. The method according to claim 15, wherein, in a fourth shifting phase, which follows the third shifting phase and is triggered by a rise of the working pressure beyond the application pressure value in the clutch actuator which is essentially fully pressurized in both nonadjacent gears, a crossover control of the working pressures is effected such that, as the working pressure in the clutch actuator which is essentially fully pressurized in both nonadjacent gears continues to rise, the working pressure in the clutch actuator which is essentially fully pressurized in the mid gear is reduced.

17. The method according to claim 16, wherein, in a fifth shifting phase, which follows the fourth shifting phase and is triggered by occurrence of the application pressure value of the working pressure in the clutch actuator which is essentially fully pressurized in the middle gear, the working pressure in the clutch actuator which is essentially fully pressurized in both nonadjacent gears is raised to a phase pressure value which is above the engagement pressure value.

18. The method according to claim 17, wherein, upon occurrence of a speed value of the speed of the input shaft which corresponds to the higher of the two nonadjacent gears, the working pressure in the clutch actuator which is essentially fully pressurized in both nonadjacent gears is reduced from the higher phase pressure value of the fifth shifting phase to the engagement pressure value.

19. The method according to claim 11, wherein, with the beginning of the first shifting phase in the another gearbox subunit which is connected into the driving connection in the middle gear, the gearwheel clutch for the loose wheel of the gearwheel stage of the middle gear is one of having been or being engaged.

20. The method according to claim 14, wherein, in the third shifting phase, when the working pressure in the clutch actuator which is essentially fully pressurized in both nonadjacent gears is completely shut off, the gearwheel clutch for the loose wheel of the gearwheel stage of the higher of the two nonadjacent gears is engaged in that gearbox subunit which is connected into the driving connection in both nonadjacent gears.

21. The method according to claim 15, wherein, the clutch-control signal is triggered by the engagement of the gearwheel clutch for the loose wheel of the gearwheel stage of the higher of the two nonadjacent gears in the third shifting phase.

* * * * *